United States Patent [19]

Nakamura et al.

[11] Patent Number: 5,696,675
[45] Date of Patent: Dec. 9, 1997

[54] ROUTE MAKING SYSTEM FOR A MOBILE ROBOT

[75] Inventors: Kyoko Nakamura, Toyonaka; Yuichi Kawakami, Itami, both of Japan

[73] Assignee: Minolta Co., Ltd., Osaka, Japan

[21] Appl. No.: 496,519

[22] Filed: Jun. 29, 1995

[30] Foreign Application Priority Data

Jul. 1, 1994 [JP] Japan .................................. 6-150820

[51] Int. Cl.⁶ .................................................. G06F 165/00
[52] U.S. Cl. .......................... 364/424.027; 364/424.029; 318/587; 180/167
[58] Field of Search .................... 364/424.027, 424.029, 364/460, 461, 423.098; 180/167, 168, 169; 318/587

[56] References Cited

U.S. PATENT DOCUMENTS

| | | | |
|---|---|---|---|
| 4,700,427 | 10/1987 | Knepper | 318/587 |
| 4,962,453 | 10/1990 | Pong et al. | 364/424.02 |
| 4,982,329 | 1/1991 | Tabata et al. | 364/424.02 |
| 5,032,775 | 7/1991 | Mizuno et al. | 364/424.02 |
| 5,280,431 | 1/1994 | Summerville et al. | 364/461 |
| 5,305,217 | 4/1994 | Nakamura et al. | 364/424.02 |
| 5,353,224 | 10/1994 | Lee et al. | 364/424.02 |
| 5,402,051 | 3/1995 | Fujiwara et al. | 364/424.02 |
| 5,548,511 | 8/1996 | Bancroft | 364/424.02 |
| 5,568,589 | 10/1996 | Hwang | 364/461 |

FOREIGN PATENT DOCUMENTS 2-127378  5/1990  Japan .

*Primary Examiner*—Gary Chin
*Attorney, Agent, or Firm*—Burns, Doane, Swecker & Mathis, LLP

[57] ABSTRACT

A route making system calculates a route for a mobile robot based on input area information including an attribute of each area. The mobile robot travels along the calculated route and carries out work proper for the attribute of each area while traveling. A mobile robot control system controls traveling and work of a mobile robot based on input area information. The mobile robot carries out work proper for the attribute of each area.

24 Claims, 21 Drawing Sheets

ROUTE MAKING SYSTEM FOR A MOBILE ROBOT

BACKGROUND OF THE INVENTION

1. Field of the Invention

The present invention relates to a route making system and a mobile robot control system for use with an autonomously mobile robot which accomplishes work (cleaning, wax application, disinfectant application and the like) indoors or outdoors in accordance with a route stored in memory.

2. Description of the Related Art

In conventional map memory methods for autonomously running robots such as autonomously running vacuum-cleaners and the like, all areas inaccessible to the body member are recorded in a map as obstructions because the working member is incorporated in the bottom section of the body member.

In the aforesaid conventional autonomously running robot, the working member is positioned in the bottom section of the body member, such that areas inaccessible to the body member are also inaccessible to the working member. When the working member is constructed so as to overhang the exterior of the body member such that the working member alone can access areas which are inaccessible to the body member, these areas are typically stored in maps as obstructions in the same way as areas which are inaccessible to the body member. Thus, disadvantages arise when making a route inasmuch as even areas which are accessible to the working member alone and which can be cleaned are determined to be obstructed areas, thereby leaving work to be done.

SUMMARY OF THE INVENTION

A first object of the present invention is to provide a route making system to run in accordance with the condition of a working area, for example, a route making system which allows direct working in areas accessible to a working member including areas which are conventionally areas of obstruction, using an autonomously running robot provided with a working member disposed on the exterior of a body member such that the working member is capable of accessing areas that are inaccessible to the body of the robot restrained only by the size and height of the working member.

A second object of the present invention is to provide a control system for running an autonomously running robot in accordance with said route.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
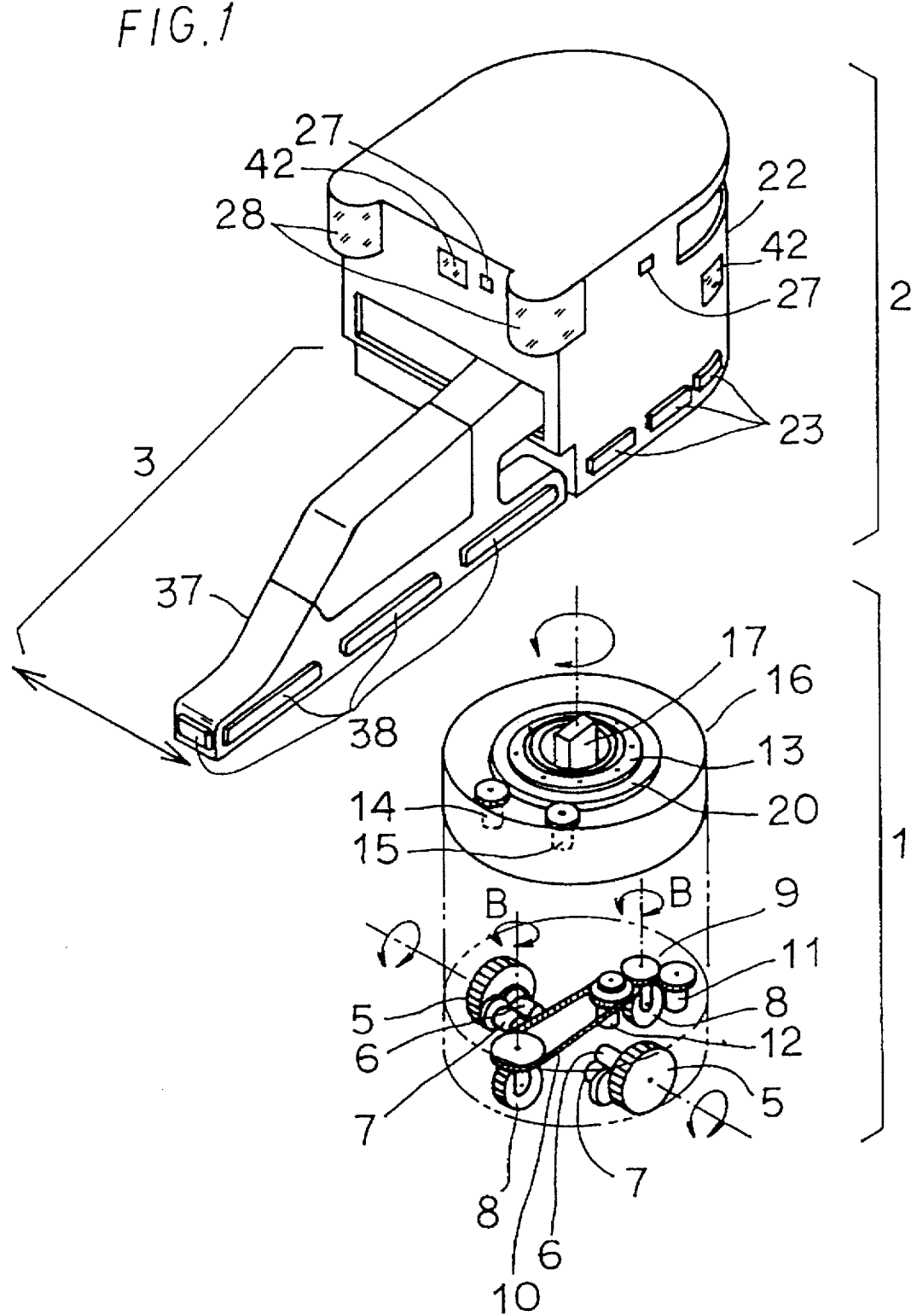
FIG. 1 is a perspective view of an autonomously running vacuum cleaner.

The embodiments of the present invention will be described hereinafter with reference to the drawings. Note that the same or corresponding portions are labeled with the same reference characters in each embodiment.

In the first embodiment, an autonomously running robot is structured into an autonomously running vacuum cleaner. FIG. 1 is a perspective view of an autonomous running vacuum-cleaner of the first embodiment, with its main components exploded. The autonomously running vacuum-cleaner includes a running member 1, a body member 2, and a working member 3.

Running member 1 will first be described. Drive wheel driving motors 6 drive two drive wheels 5, respectively, and are fixed to a frame 16. Distance detectors 7 for reading out the number of rotations of motors 6, that is, the number of rotations of drive wheels 5, through a gear and measuring the distance covered by the autonomously running vacuum-cleaner are connected to drive wheel driving motors 6, respectively. Further, a suspension mechanism, not shown, is provided to at least one of drive wheels 5. Even when the autonomously running vacuum-cleaner runs on a floor having a recess and a projection, the suspension mechanism makes drive wheels 5 always in contact with the floor to prevent idle running of drive wheels 5 and to stabilize running of the vacuum cleaner. The suspension mechanism also decreases an error of the distance detector.

Two steering wheels 8 are supported by frame 16. Two steering wheels 8 are coupled to one steering wheel driving motor 12 by a gear group 9 and a belt 10. Gear group 9 and belt 10 cause the two steering wheels to rotate oppositely in the direction indicated by double-headed arrow B's. A potentiometer 11 is attached to steering wheel driving motor 12 through gear group 9, so that potentiometer 11 can measure a rotation angle of steering wheels 8 in the direction of the double-headed arrow B. Steering wheels 8 and drive wheels 5 support the weight of the autonomously running vacuum-cleaner.

Figure 2:
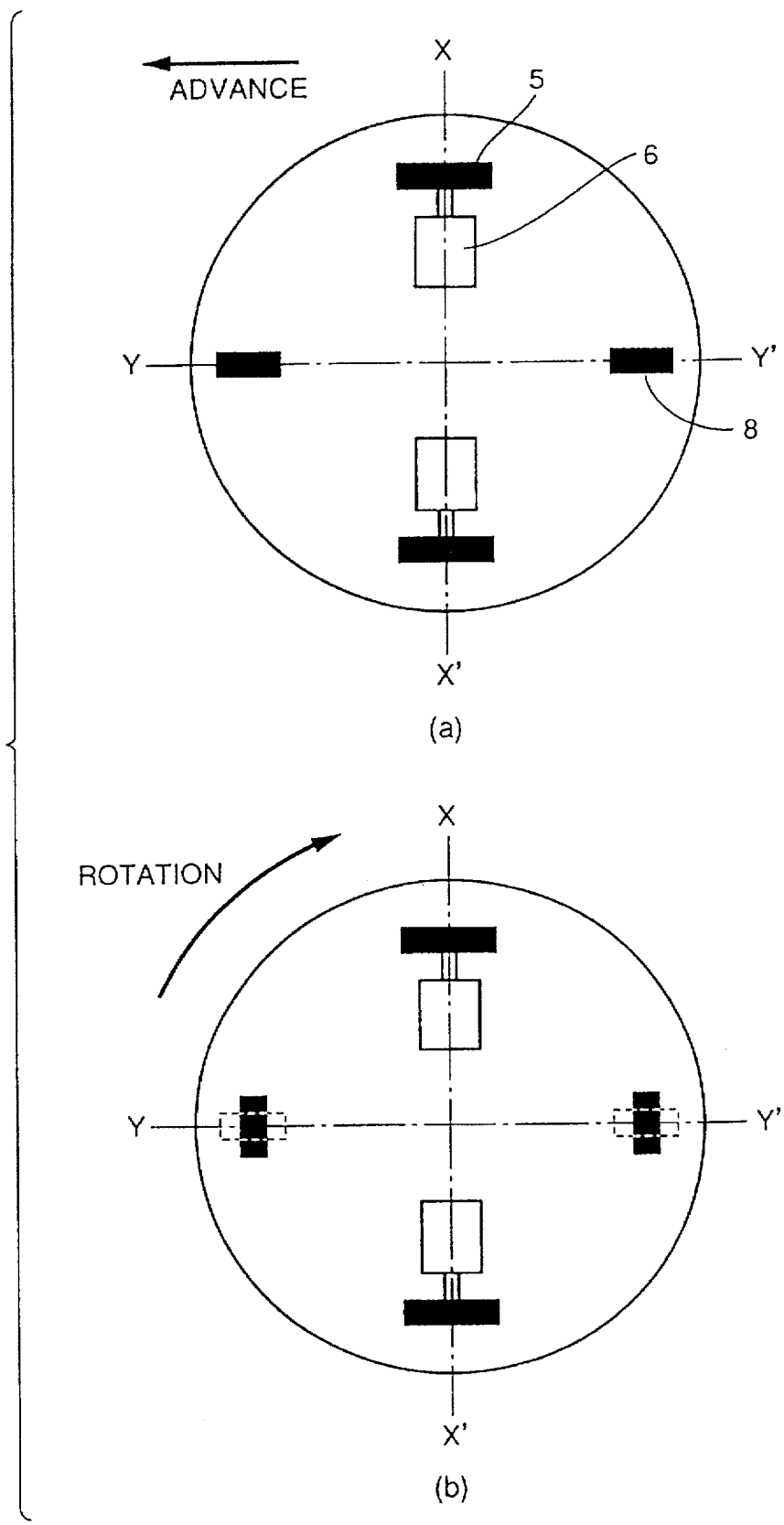
FIG. 2 shows the advancement and rotation operations of the autonomously running vacuum cleaner.

As shown in FIG. 2, two drive wheels 5 are arranged on the line X-X' in symmetry, and steering wheels 8 are arranged on the line Y-Y' perpendicular to the line X-X'.

Description will be given of an example of a method of advancing or rotating the autonomously running vacuum-cleaner using running member 1.

As shown in FIG. 2(a), when running member I runs straight, the running member holds steering wheels 8 in parallel with the line Y-Y', and rotates two drive wheel driving motors 6 in the same direction. When the running member rotates around the center of the body, the running member can rotate by holding steering wheels 8 orthogonal to the line Y-Y' using steering wheel driving motor 12, as shown in FIG. 2(b), and rotating two drive wheel driving motors 6 in the opposite directions.

Figure 3:
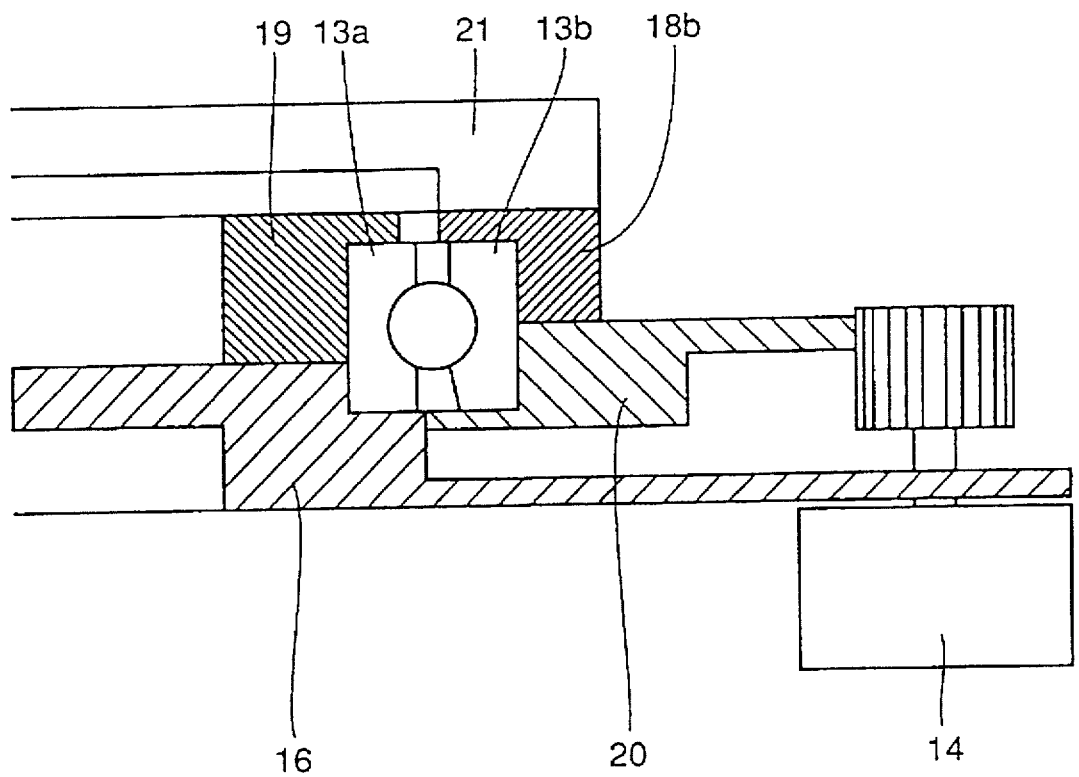
FIG. 3 shows the robot body rotation mechanism of the autonomously running vacuum cleaner.
Figure 4:
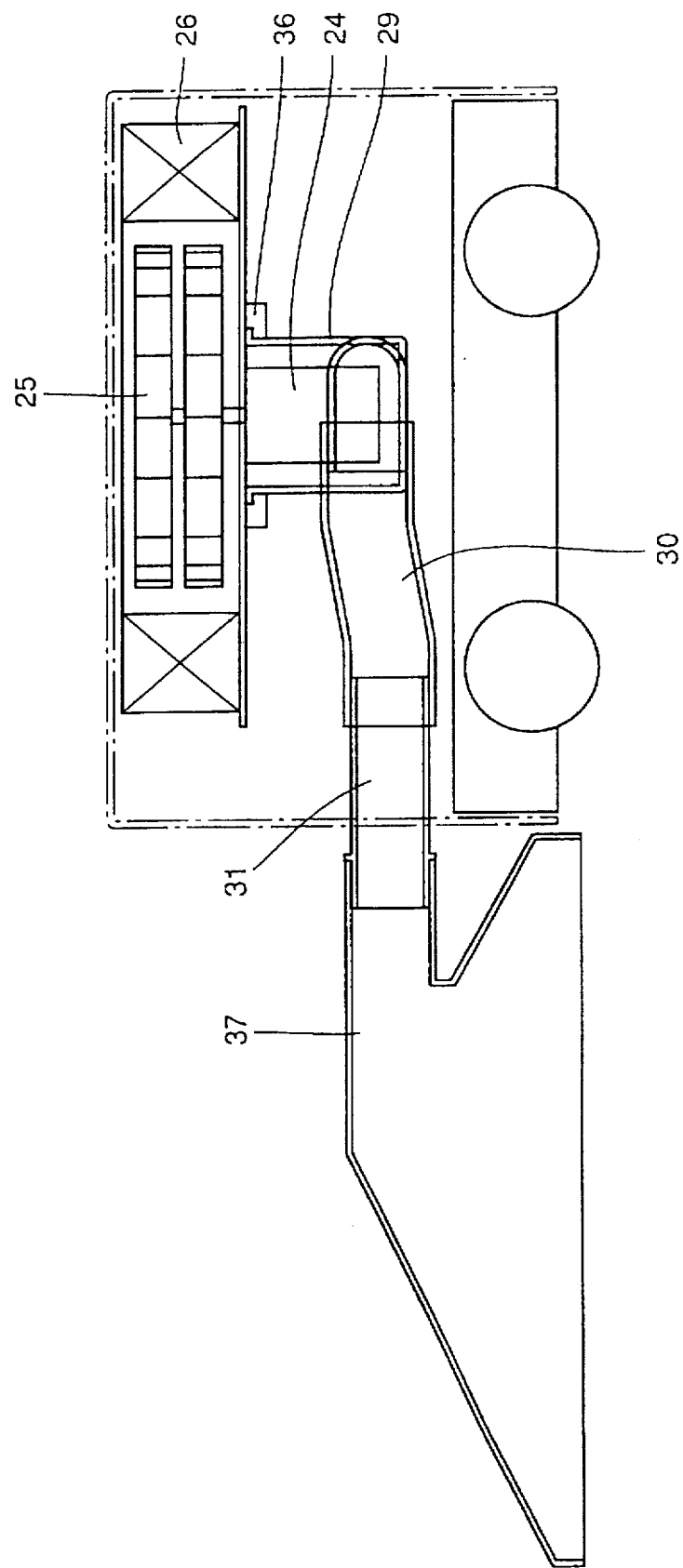
FIG. 4 is a section view of the autonomously running vacuum cleaner.

Running member 1 is further provided with a bearing mechanism 13 rotating body member 2 with respect to running member 1. As shown in FIG. 3, running member frame 16 is fixed to a bearing inner wheel 13a of bearing mechanism 13 by a bearing inner wheel holder 19, and a body member rotating and driving gear 20 is fixed to a bearing outer wheel 13b of bearing mechanism 13 by a bearing outer wheel holder 18. Further, a body member frame 21 is fixed to bearing outer wheel holder 18.

By the structure as described above, body member 2 can be rotated with respect to running member 1 independently. Further, a body member rotating motor 14 is attached to running member frame 16 to drive body member rotating and driving gear 20 through the gear. Further, a potentiometer 15 (cf. FIG. 1) is attached to body member rotating and driving gear 20 through the gear so that a rotation angle of body member 2 with respect to running member 1 can be precisely detected.

In this embodiment, a stepping motor is used as body member rotating motor 14 to rotate running member 1 and body member 2. However, the same function can be implemented by replacing the stepping motor with a servo motor. In the body member rotation mechanism body member 2 can be rotated by approximately 90 degrees approximately +90 degrees with respect to the Y-Y' axis of running member 1. Further, a gyro sensor 17 is mounted in the vicinity of the center of rotation of running member 1. Gyro sensor 17 is used for detection of a rotation angle of running member 1 and control of straight movement of running member 1.

Description will now be given of body member 2. Body member 2 can be rotated with respect to running member 1. An outer case 22 of body member 2 is attached so as to cover running member 1. A plurality of contact sensors 23 are provided side by side on a lower peripheral surface of outer case 22, so that contact of body member 2 with a wall or obstacle can be sensed.

Body member 2 further includes a distance sensor 27 for measuring the distance up to the wall or obstacle, a position detecting unit 28 for receiving light emitted from a cleaning start point and recognizing the position and the azimuth of body member 2, an infrared communication device 42 for carrying out communication to and from the outside world, and the like.

Driving motors 6, body member rotating and driving motor 14, gyro sensor 17, and the like of running member 1 are under power supply control and drive control by a power supply portion and a control portion, not shown, of body member 2. Therefore, power supply lines and control lines for driving motors 6, body member rotating and driving motor 14, and gyro sensor 17 pass through the center portion of ring-shaped bearing mechanism 13 connecting running member 1 and body member 2, thereby preventing a large torsion Or the like of the lines caused by rotation of running member 1 and body member 2.

Description will now be given of working member 3 with reference to FIGS. 1, 4, 5 and 6. Reference number 24 refers to a vacuum motor to which a vacuum relay portion 29, a vacuum hose 30, a nozzle relay portion 31, and a vacuum nozzle 37 vacuuming dust on the floor are sequentially coupled. Like outer case 22, vacuum nozzle 37 is provided with a plurality of contact sensors 38 at its lower peripheral side surface (cf. FIG. 1), so that contact of vacuum nozzle 37 with a wall or obstacle can be sensed.

Vacuum nozzle 37 is elongate, so that it can be inserted into a small space. Vacuum nozzle 37 has a vacuum opening therearound. The exhaust air of a vacuum fan portion 25 is discharged through a ventilating filter 26 after particulates are removed. Vacuum nozzle relay portion 31 provided at an end of vacuum nozzle 37 is attached to a guide plate 32 shown in FIG. 6. Guide plate 32 can move right and left on a rail 34 attached to body member frame 21.

Guide plate 32 is engaged with a slide belt 35 driven right and left by a slide motor 33 attached to body member frame 21. Guide plate 32 moves on rail 34 together with sliding of slide belt 35. Therefore, working member 3 is slidably driven right and left by slide motor 33 (cf. FIG. 6).

Figure 5:
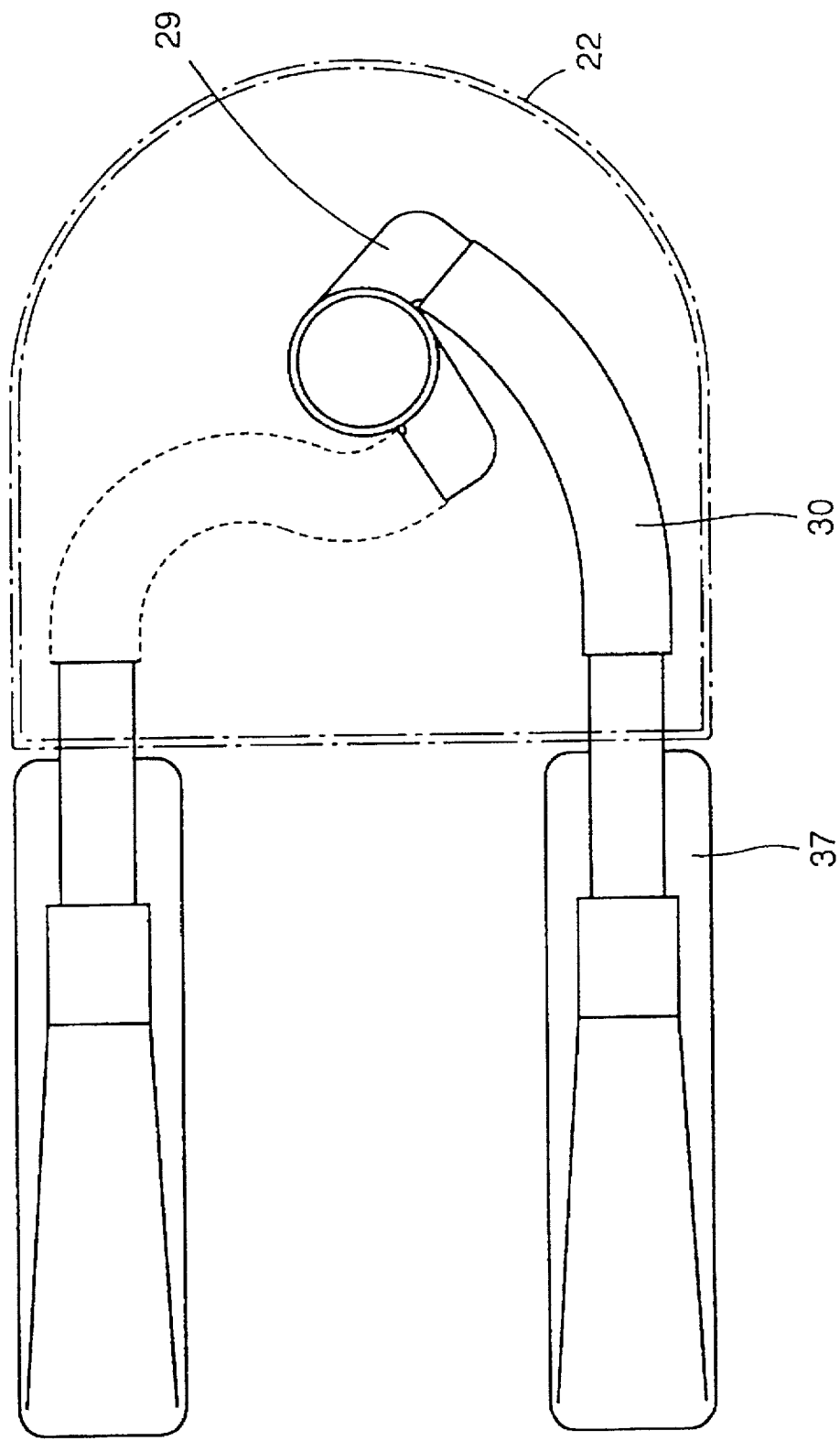
FIG. 5 illustrates the operation of the working member of the autonomously running vacuum cleaner.
Figure 6:
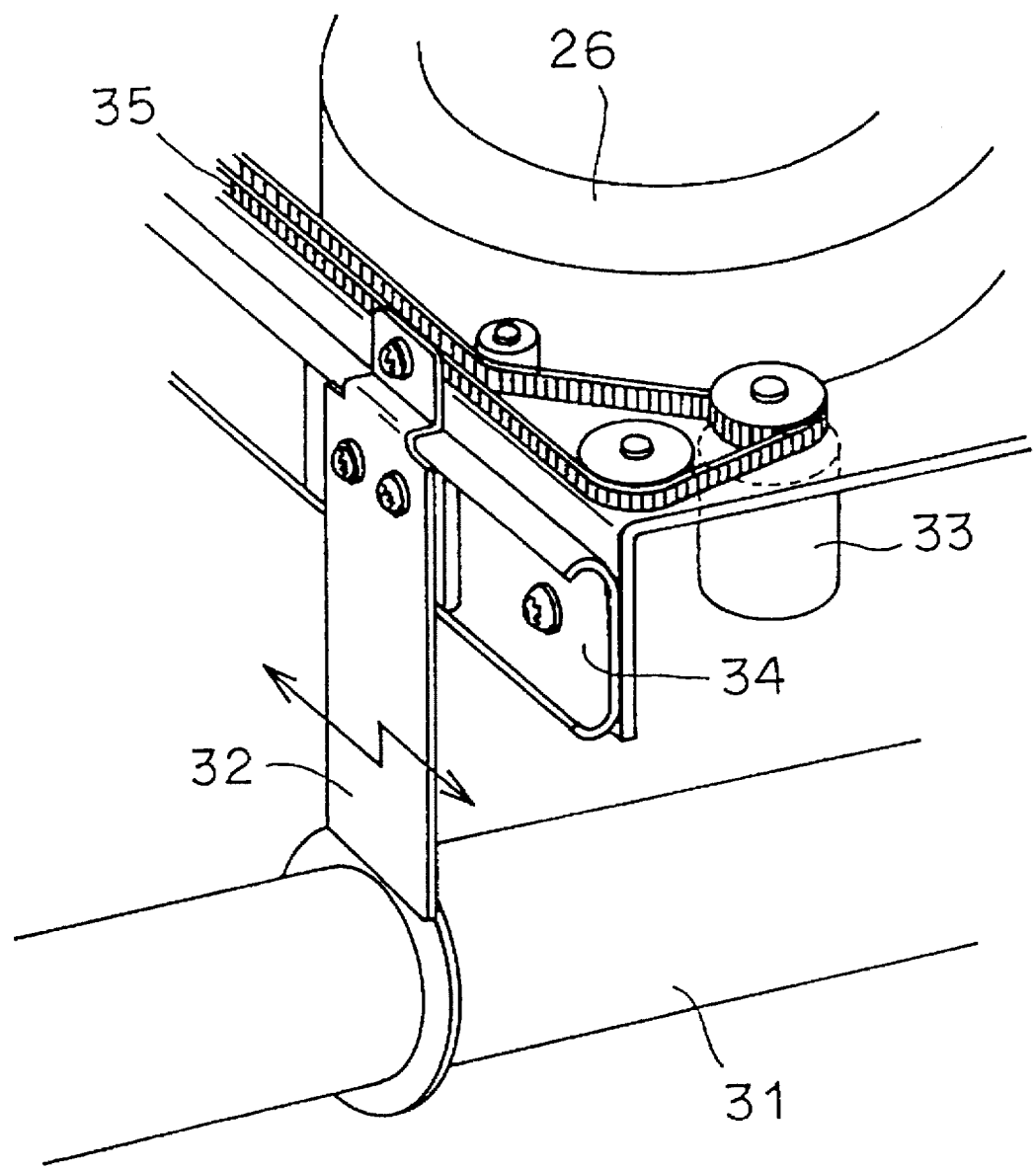
FIG. 6 is a perspective view of the vacuum nozzle slide mechanism of the autonomously running vacuum cleaner.

In order to ensure moving of vacuum nozzle 37 without restriction, vacuum relay portion 29 is attached to the side of the inner wheel of a ring-shaped bearing 36, and body member frame 21 is attached to the side of the outer wheel. By thus structured, vacuum relay portion 29 can be rotated with respect to body member frame 21, as shown in FIG. 5. When vacuum nozzle 37 is placed on the right side of rail 34, as shown in FIG. 5, vacuum relay portion 29 is pushed into vacuum hose 30, and rotated left.

On the other hand, when vacuum nozzle 37 moves in parallel on rail 34 towards left in the figure with movement of guide plate 32, vacuum hose 30 moves left by being dragged by vacuum nozzle relay portion 31. Further, vacuum relay portion 29 also rotates right so that vacuum nozzle 37, vacuum hose 30, and vacuum relay portion 29 can move smoothly.

Figure 7:
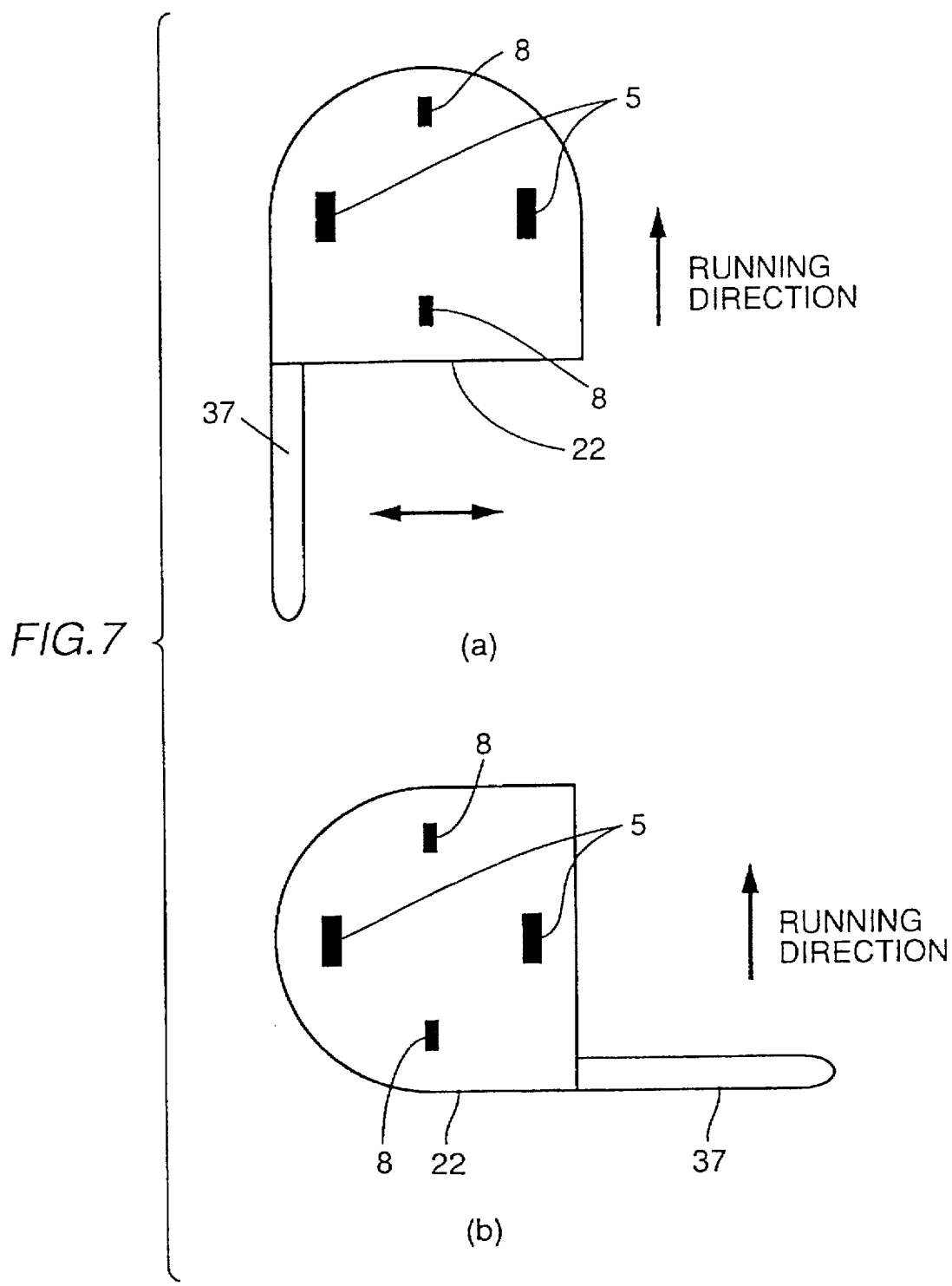
FIG. 7 illustrates examples of the working operation of the autonomously running vacuum cleaner.

An example of a method of a running work by this mechanism will now be shown. When a work is carried out in a large area, vacuum nozzle 37 is positioned backward with respect to the running direction, as shown in FIG. 7(a). The running member moves forward with steering wheels 8 facing the running direction. And right and left drive wheels 5 rotating in the same direction. By sliding vacuum nozzle 37 right and left with respect to the running direction, a work using an elongate nozzle in a large area is facilitated.

The similar effect is obtained by positioning vacuum nozzle 37 perpendicular to the running direction by the above described body member rotation mechanism, as shown in FIG. 7(b), and moving the running member forward with vacuum nozzle 37 fixed. In this case, vacuum nozzle 37 may be fixed at any position within the sliding range.

Figure 8:
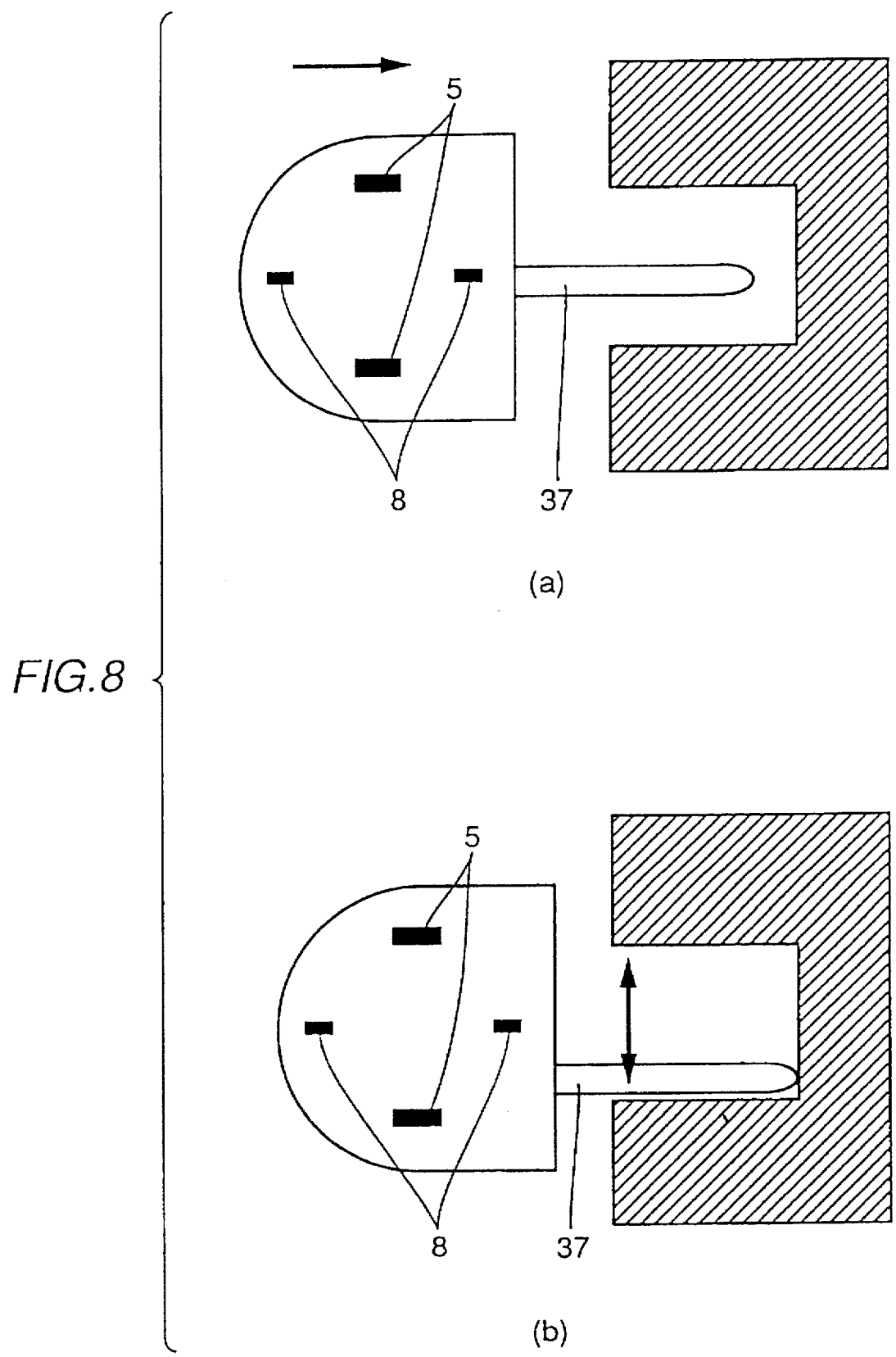
FIG. 8 illustrates examples of the work sequence in a confined area of the autonomously running vacuum cleaner.

When a work is carried out to a narrow portion such as a space, the running member moves forward with the nozzle inserted into the space, as shown in FIG. 8(a). The running member stops at a position appropriate for the work, slides the nozzle in that state, as shown in FIG. 8(b), and carries out the work to the space.

Figure 9:
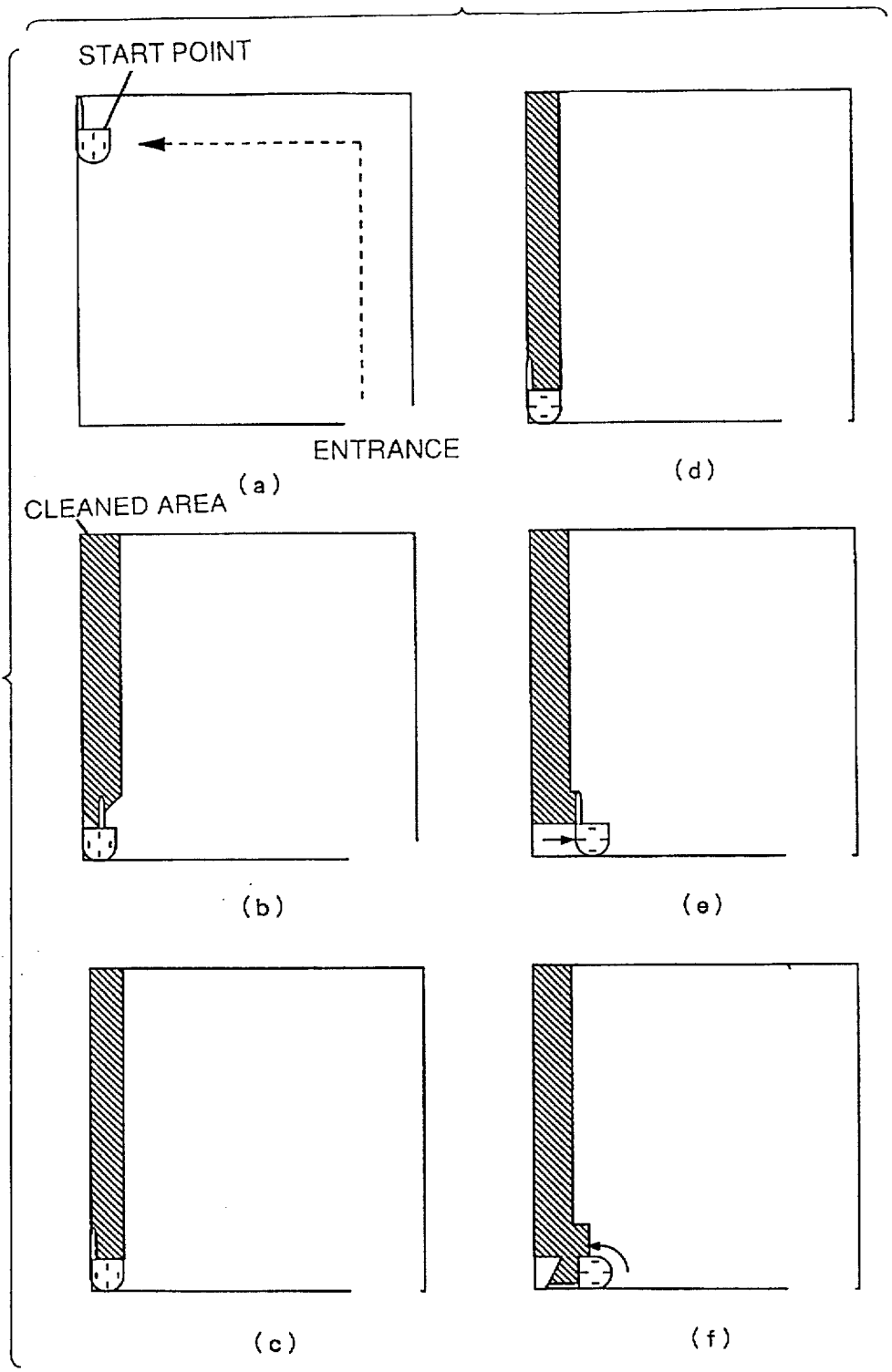
FIG. 9 illustrates examples of an indoor work sequence of the autonomously running vacuum cleaner.
Figure 10:
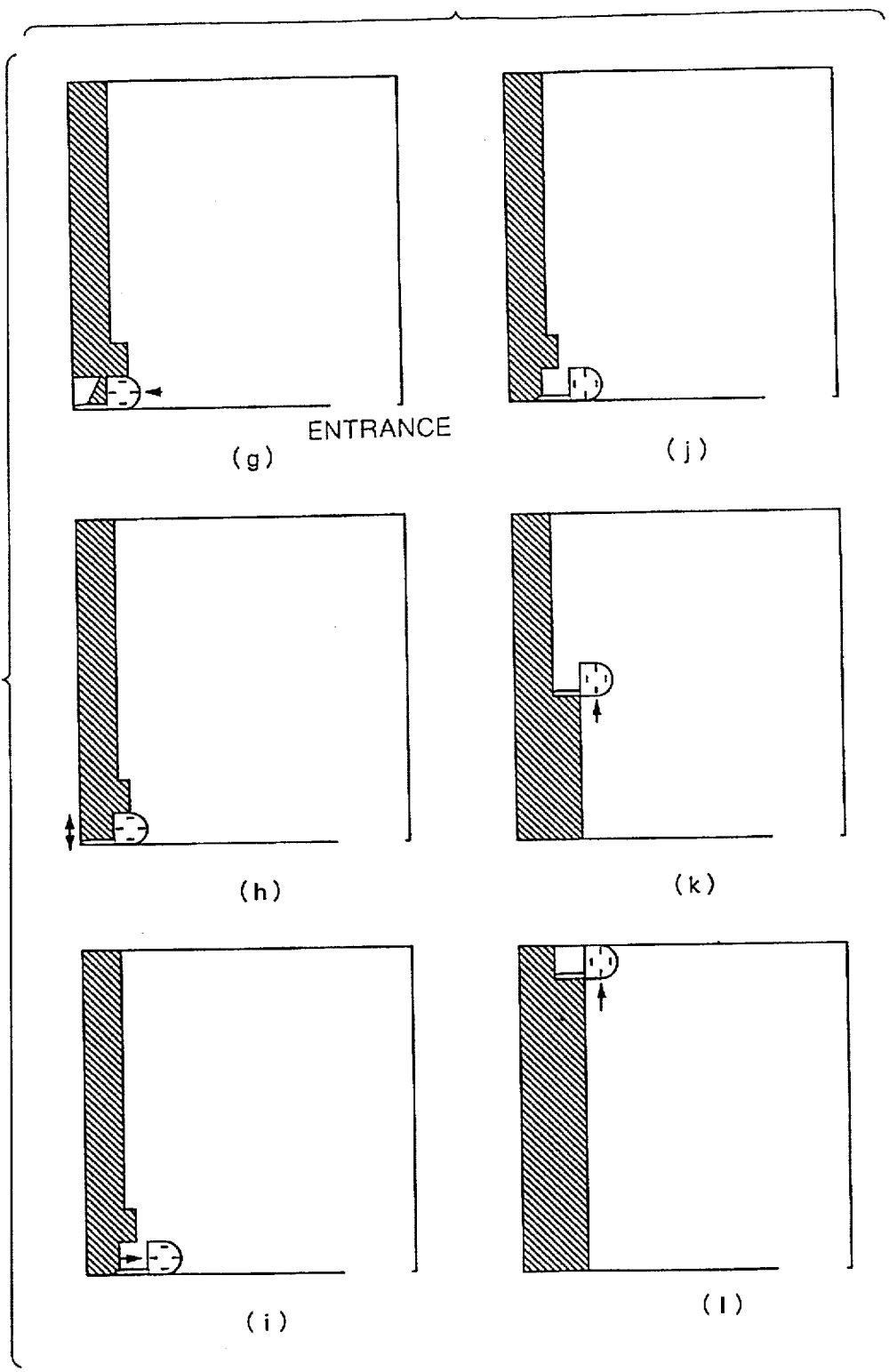
FIG. 10 illustrates examples of an indoor work sequence of the autonomously running vacuum cleaner.
Figure 11:
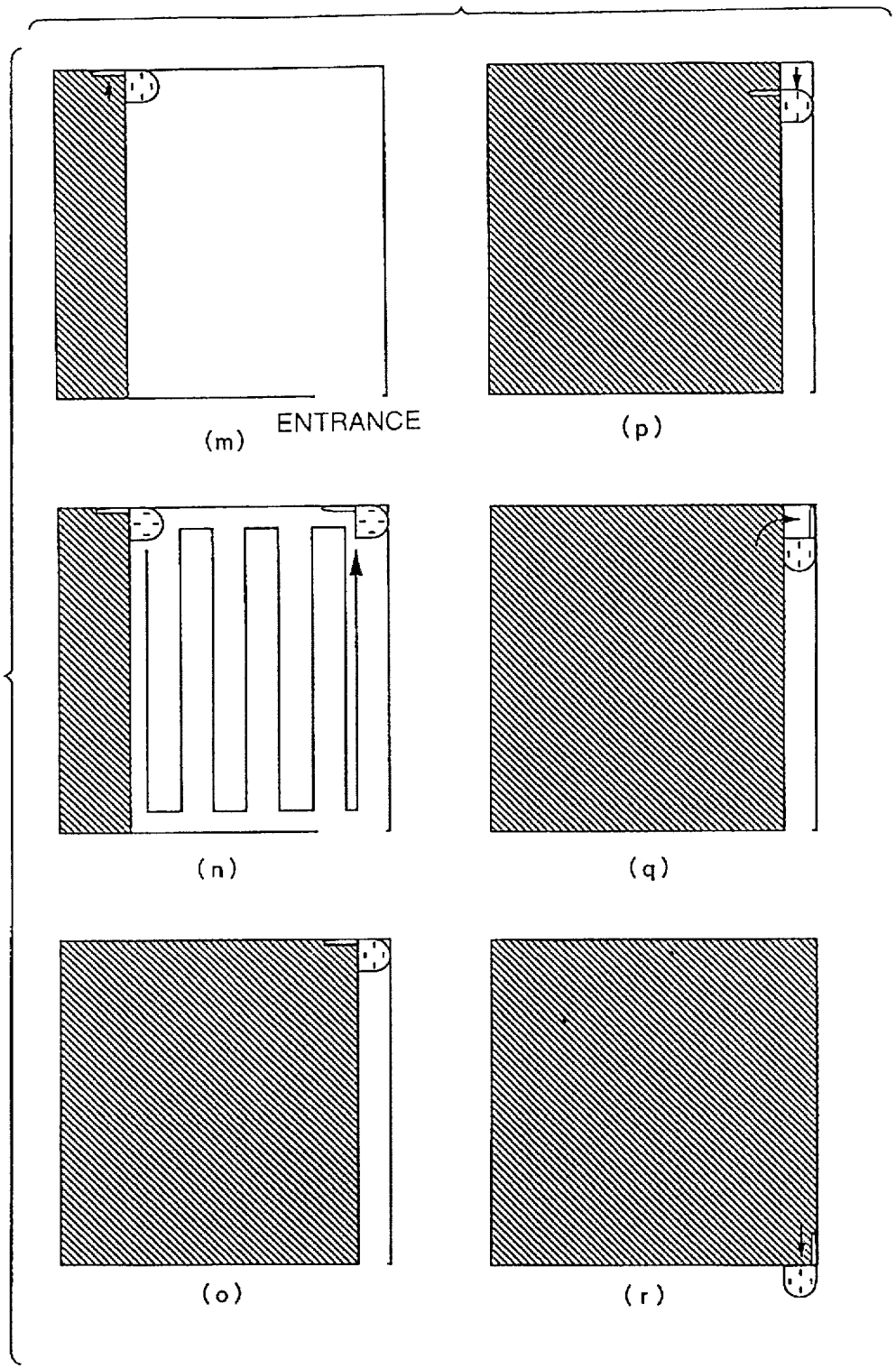
FIG. 11 illustrates examples of an indoor work sequence of the autonomously running vacuum cleaner.

Examples of sequences for complete indoor cleaning with reciprocal movement are shown in FIGS. 9–11 (FIGS. 9–11 show sequential operations) combining the previously described functions. Typically, when vacuuming a room which has only a single entrance, vacuuming is effectively accomplished by using the innermost point from the entrance as a starting point and using the entrance as an ending point so as to clean the dust from the interior of the room toward the entrance without leaving any space unvacuumed.

First, the autonomously running vacuum cleaner advances from the entrance to the starting point, as shown in FIG. 9(a). Thereafter, vacuuming is accomplished along the side wall from the starting point. Walls are vacuumed with the long edge of the vacuum nozzle facing the wall to effectively remove the debris from the wall area. As the body member advances along the wall, vacuum nozzle 37 slides as shown in FIG. 7(a) to clean the wall (refer to FIG. 9(b)).

The main unit advances to the front wall (FIG. 9(c)), then only the running member rotates 90° to the left (FIG. 9(d)). Thereafter, the main unit advances along the front wall to a position at which body member 2 and vacuum nozzle 37 can change position (FIG. 9(e)). After advancing the required distance, body member 2 and vacuum nozzle member 4 are rotated (FIG. 9(f)).

Then, the main unit is retracted until vacuum nozzle 37 comes into contact with the side wall (FIG. 10(g)). In this state, vacuuming along the wall can be completely accomplished by one reciprocation of vacuum nozzle 37. After the aforesaid reciprocal movement, vacuum nozzle 37 is positioned along the side wall. Thus, the autonomously running vacuum cleaner is in a state along the front wall (FIG. 10(h)).

As the overlap of the cleaning area is adjusted, the main unit advances to the next area to be vacuumed (FIG. 10(i)). The travel direction of the autonomously running vacuum cleaner is changed by again rotating the running member (FIG. 10(j)). Vacuum nozzle 37 continues to vacuum with the long edge side relative to the direction of travel (FIG. 10(k)), and moves until making contact with the front wall. Upon reaching the front wall (FIG. 10(l)), vacuum nozzle 37 slides to the wall to vacuum the remaining area (FIG. 11(m)). The direction of travel is changed along the front wall by rotating the running member, and the main unit advances as the overlap area is adjusted so as to move to the next area to be vacuumed.

The reciprocating movement continues in the same manner until the side wall is reached (FIG. 11(n)), at which time the work has been accomplished to the state shown in FIG. 11(o)). The direction of the main unit is changed to vacuum along the side wall to complete the operation. Thus, the main unit advances along the side wall on the end side to a position at which body member 2 and vacuum nozzle 37 can change direction (FIG. 11(p)). After body member 2 and vacuum nozzle 37 are rotated, vacuum nozzle 37 is retracted until it makes contact with the wall (FIG. 11(q)).

After vacuum nozzle 37 slides toward the opposite side along the wall and the area behind the main unit is vacuumed, nozzle 37 is slidingly advanced to clean along the side wall. At this time, since the length and width dimensions of the main unit are the same, vacuuming is accomplished without leaving an area uncleaned (FIG. 11(r)). Thus, an entire room can be vacuumed by the apparatus of the present of the embodiment in the sequence described above.

When vacuuming indoors using the aforesaid autonomously running vacuum cleaner, there are areas that can be cleaned which are accessible only by the vacuum nozzle and inaccessible to the main unit because the width and height of nozzle 37 are restrained as described above.

Figure 12:
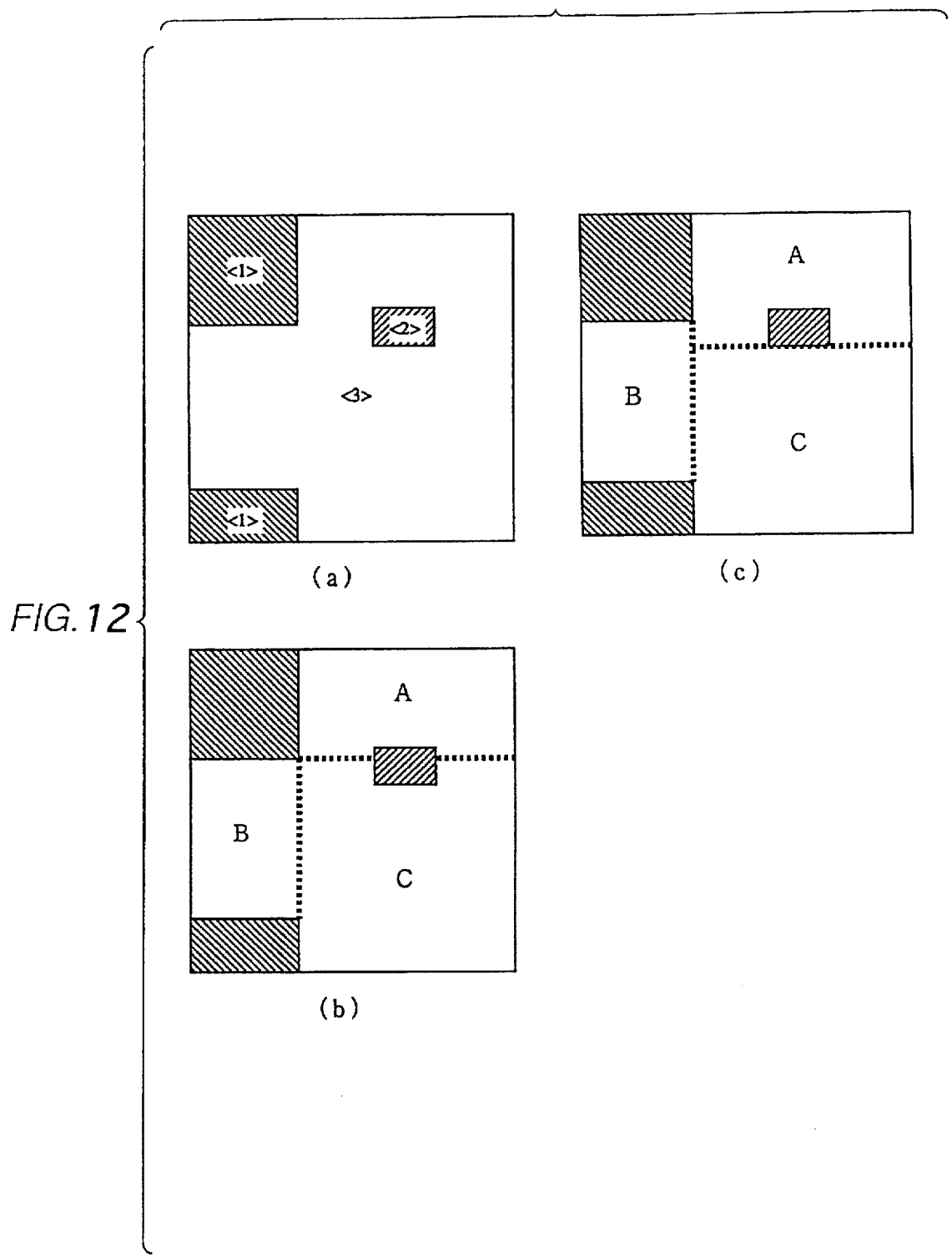
FIG. 12 illustrates examples of area divisions.

Therefore, the autonomously running vacuum cleaner of the present embodiment is provided with a map such as shown in FIG. 12 which is divided into three areas having various attributes, i.e., areas which are inaccessible to nozzle 37 and cannot be cleaned by the main unit, areas which are inaccessible to the main unit but accessible to the nozzle member, and areas which are readily accessible to both the main unit and the nozzle member. This map can be maintained in the autonomously running vacuum cleaner unit, or may be maintained in a robot control device provided externally to the autonomously running vacuum cleaner unit.

The robot control system used in the present embodiment is described hereinafter.

The robot control system of the present invention is described below. This robot control system is provided with a map recording function for creating maps having attributes corresponding to area states based on input information, route making function for creating suitable routes for the autonomously running vacuum cleaner based on recorded maps, and robot control function for controlling the work content and running of the autonomously running vacuum cleaner in accordance with a created route.

This robot control system comprises input section 51 such as a keyboard and the like, central processing unit (CPU) 50 for various controls, map memory 56 for storing created maps, route memory 57 for storing the created routes, and communication section 58 for transmitting control information to the autonomously running vacuum cleaner. CPU 50 comprises map making section 52 for creating area maps with attributes, route making section 53 for creating routes for the autonomously running vacuum cleaner based on said area map, running control section 54 for controlling the running of the autonomously running vacuum cleaner, and work control section 55 for controlling the working state of the autonomously running vacuum cleaner.

The map recording function is described below. First, the entire work area is input via input section 51 (keyboard). The input includes coordinate data and distance data. When the entire work area has been input, attributes of the areas are input. At this time, attributes of each area are input simultaneously. Thus, an area map with attributes is created by map making section 52 based on the input data. This area map is stored in memory 56.

The autonomously running vacuum cleaner of the present embodiment is discussed below with respect to specific attributes. The areas designated by attribute <1> in FIG. 12(a) are areas inaccessible to both the main unit and vacuum nozzle 37; the areas designated by attribute <2> are areas which are accessible to nozzle 37 but inaccessible to the main unit; the areas designated by attribute <3> are unobstructed and freely accessible to both the main unit and nozzle 37. Although this map is illustrated for convenience, there is no problem with numerical value data such as construction and layout numerical values in a computer.

Figure 13:
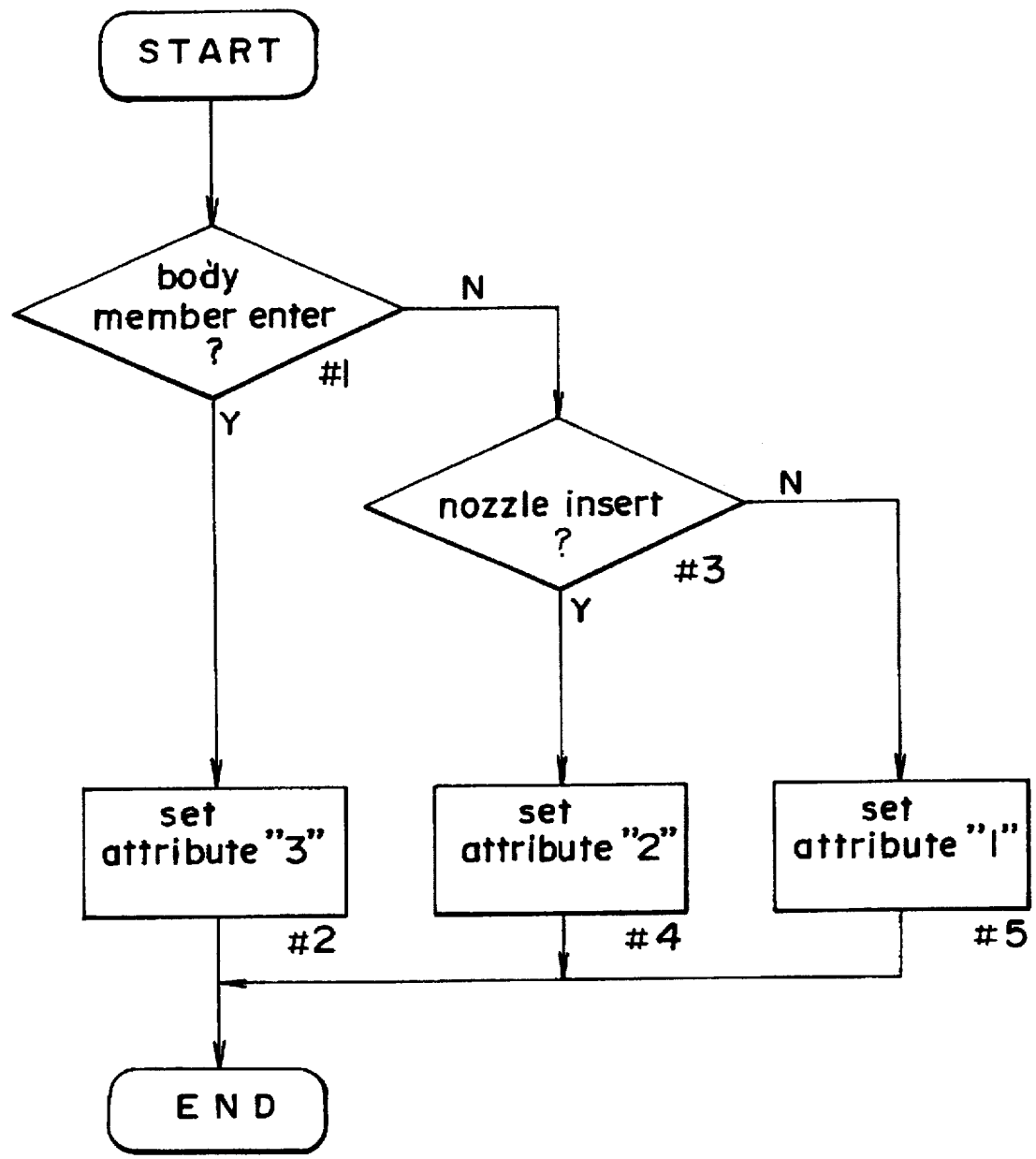
FIG. 13 is a flow chart representing area attribute divisions.

The sequence of attributes of the areas is described hereinafter with reference to the flow chart of FIG. 13.

First, a check is made to determine whether or not the autonomously running vacuum cleaner unit can access an area so as to provide an attribute (step #1). When it is determined that the main unit can access the area, said area is given attribute <3> (step #2). When it is determined in step #1 that the main unit cannot access an area, the routine advances to step #3. In step #3 a check is made to determine whether or not the vacuum nozzle of the autonomously running vacuum cleaner can access the area. When it is determined that the vacuum nozzle can access the area, said area is given attribute <2> (step #4). When it is determined in step #3 that the vacuum nozzle cannot access the area, said area is given attribute <1> (step #5). Thus, the area is classified by three attributes.

The route making function of the robot control system is described hereinafter. First, the area map stored in map memory 56 is read out. A route for the autonomously running vacuum cleaner is automatically created in the area of each attribute based on the area map so as to allow suitable working in said areas. The created route is stored in route memory 57.

The aforesaid route making method changes in accordance with area attributes and work content of the autonomously running vacuum cleaner. An example is given below for making a route for the autonomously running vacuum cleaner of the present embodiment.

The regions excluding that designated attribute <1> are divided into rectangular shaped areas A, B, and C, as shown in FIG. 12(b). The reason for the division into rectangular areas is to facilitate division, and simplify the design of the work within the divided areas.

When a region given attribute <2> is above a boundary line, the boundary line is moved so that the area given attribute <2> is in one or another of the areas, as shown in FIG. 12(c). In the case of FIG. 12(b), the area given attribute <2> crosses area A and area C, so that the boundary line is moved to revise the rectangular area such that the area given attribute <2> is completely included in area A.

In FIG. 12, the attributes of simple areas have been briefly described for purposes of the description, but it is to be understood that areas having complex attributes may be divided into simple rectangular areas if this method is applied. The sequence for dividing work areas having complex attributes into rectangular areas based on said attributes is described hereinafter with reference to the flow charts of FIGS. 14 and 15.

A map of desired area divisions is shown in FIG. 14(a).

A division line (lines a~j in FIG. 14(b)) is drawn from each vertex of attribute <1> within an area, so as to divide the attribute <3> region (step #11). Then, a check is made to determine whether or not any division lines within said division lines crosses an attribute <2> area, as in the case of division line d in FIG. 14(b) (step #12). If a division line is determined to cross an attribute <2> area, this division line is moved to the edge of the attribute <2> area (FIG. 14(c); step #13). At this time, when the nozzle is inserted into an attribute <2> area from a specific direction only, the movement direction of the division line is set so as to avoid overlap of the side surface of the inserted nozzle with the division line. Steps #12 and #13 are repeated until there are no more division lines crossing the attribute <2> area.

Then, a check is made to determine whether or not the rectangle includes an attribute <2> area, as in the rectangle circumscribed by thick lines in FIG. 14(d) (step #14). If it is determined that the rectangle includes an attribute <2> area, this rectangle is set (FIG. 14(d); step #15). Steps #14 and #15 are repeated until there are no more rectangle containing attribute <2> areas.

Next, a check is made to determine whether or not the remaining areas (non-set areas) are attribute <3> areas (step #16). If it is determined that an attribute <3> area remains, the remaining regions (rectangles) are merged to form a larger surface area, and the rectangle of maximum surface area is set (FIG. 14(e); step #17). Steps #16 and #17 are repeated until all areas are set, so as to ultimately achieve the area divisions as shown in FIG. 14(f).

In the present embodiment, a condition is that the remaining attribute <3> areas are merged in step #17 so as to maximize the surface area of the rectangle after said merge, but other merging conditions may be considered, e.g., merges to minimize the number of rectangle and the like.

Then, suitable route are made for the various divided areas. The route making method is described hereinafter using the areas of FIG. 12 as examples.

Since area A contains an attribute <2> area which is accessible to the vacuum nozzle but inaccessible to the main unit, a route must be created which include an operation relative to said attribute <2> area.

Figure 16:
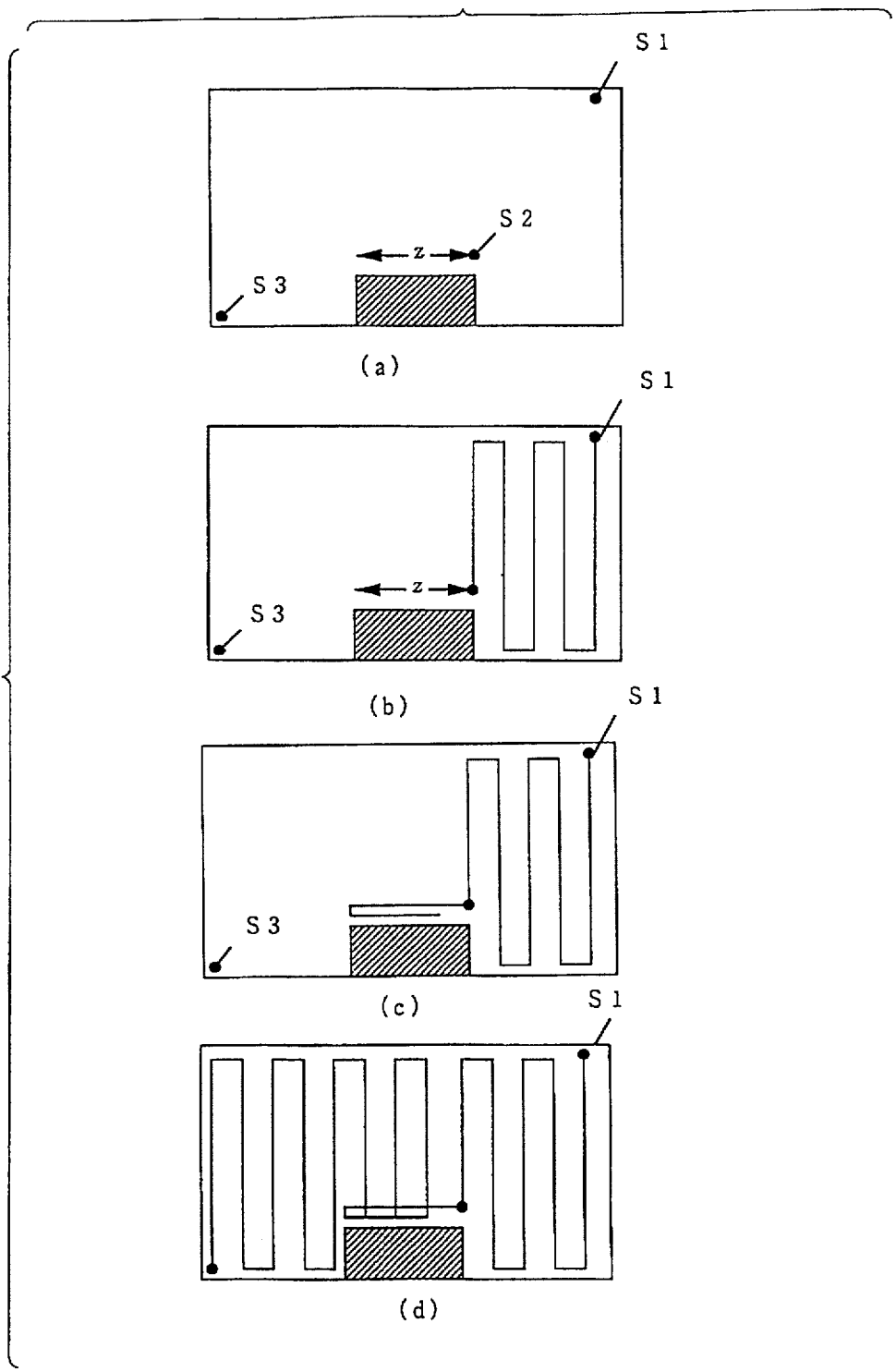
FIG. 16 shows an example of a work route when some areas are accessible to the working member alone.
Figure 17:
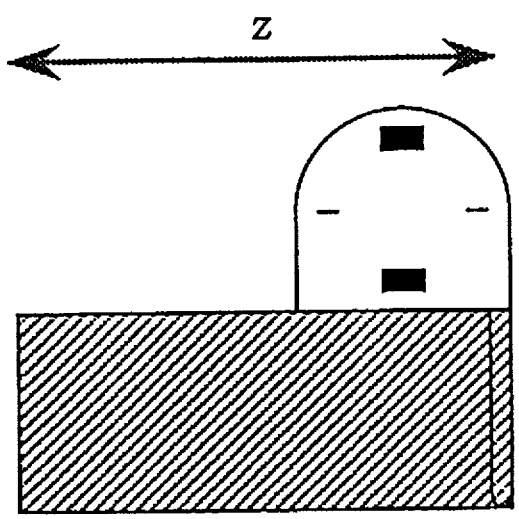
FIG. 17 shows work examples when some areas are accessible to the working member alone.

A method for making a suitable route for area A is described in detail below with reference to FIG. 16. FIG. 16 shows area A. Point S1 is designated the work starting point (FIG. 16(a)), and cleaning is accomplished with the previously described (FIGS. 9 and 10) reciprocating operation until point S2 (FIG. 16(b)). The bottom of the attribute <2> area of FIG. 12 is cleaned via the insertion of vacuum nozzle 37 as shown in FIG. 17.

In order to clean the attribute <2> area, when the autonomously running vacuum cleaner reaches point S2, the direction of the main unit is changed, such that vacuum nozzle 37 reciprocally moves and vacuums range Z of FIG. 16 via insertion in the attribute <2> area as shown in FIG. 16 (FIG. 16(c)). After the attribute <2> area is vacuumed via the reciprocating operation over range Z, the direction of the main unit is again changed, so as to return to the initial reciprocating operation and vacuuming continues until point S3 (FIG. 16(d)).

Figure 18:
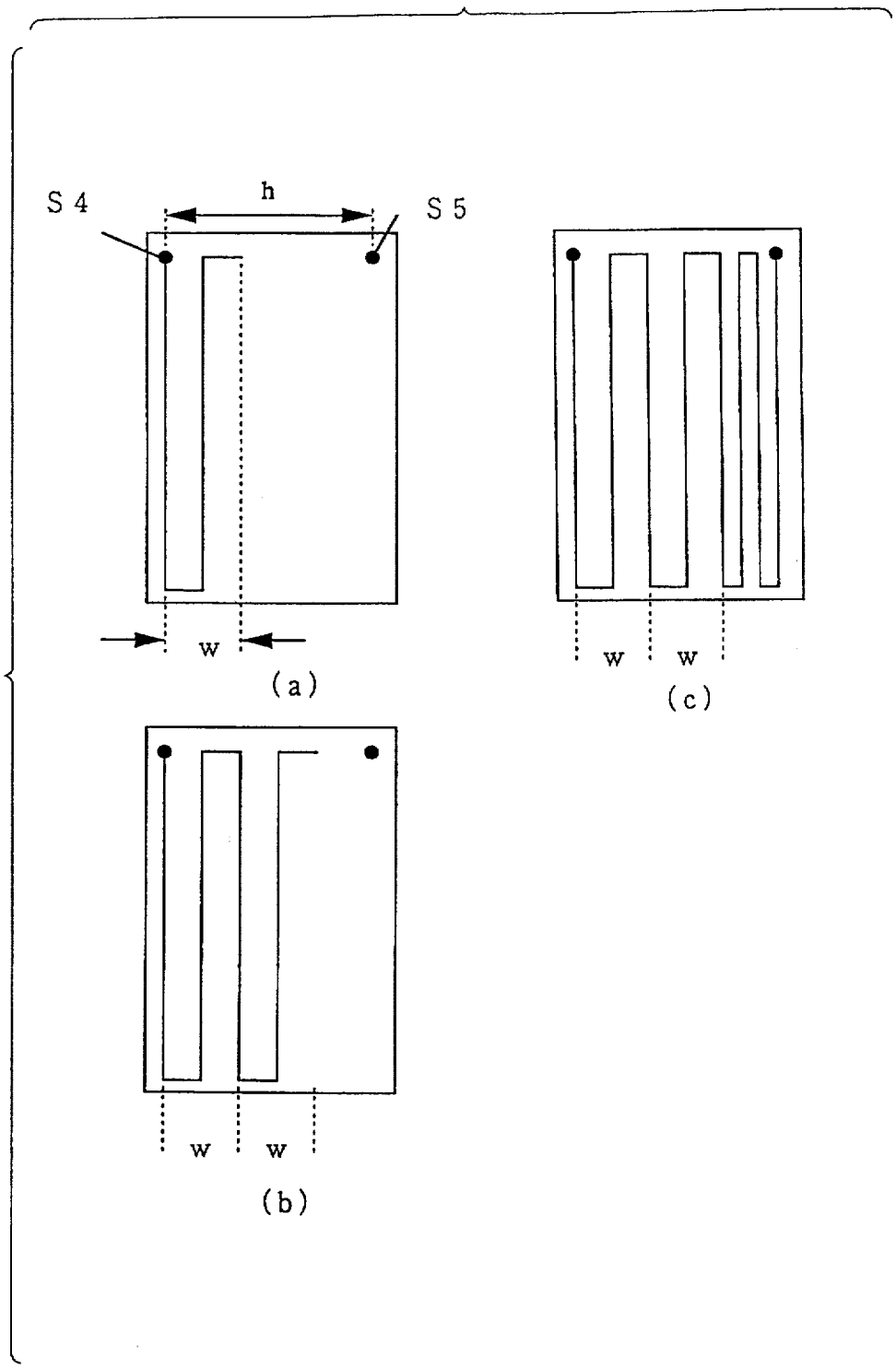
FIG. 18 is an illustration showing an example of a running route of a robot in area B.

Routes are created for simple reciprocation travel only for areas B and C as previously described. An example of a method for making a route of complete running within a rectangle such as area B of the present embodiment is shown in FIG. 18. The amount of movement of a single reciprocation of the vacuuming operation is designated w in consideration of the overlap of the cleaning region. Consideration is given to overlap in the vacuuming region in anticipation of errors generated in the advance and rotation of the autonomously running vacuum cleaner so as to maintain a surplus to avoid a residual work area at the end.

When moving from point S4 to point S5 in FIG. 18, the distance h from point S4 to point S5 has a remainder when the lateral movement amount w is excluded, such that the amount of lateral movement is reduced to arrive at point S5. That is, reciprocal movement starts from point S4 by lateral movement amount w (FIG. 18(a)), and said reciprocal movement continues until the width of the residual area is less than w (FIG. 18(b)). Work over this residual area having a width less than the lateral movement w is accomplished by reducing the amount of lateral movement until point S5 is attained so as to ultimately reach point S5 (FIG. 18(c)).

Figure 19:
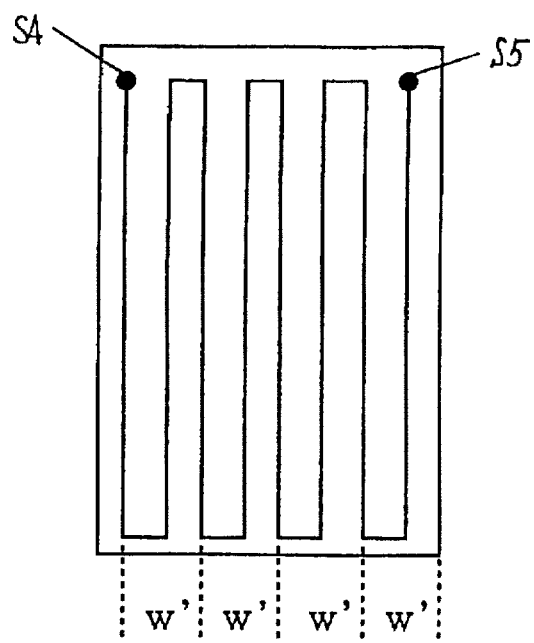
FIG. 19 shows an example of a running route of a robot when horizontal travel is uniform throughout area B.
Figure 20:
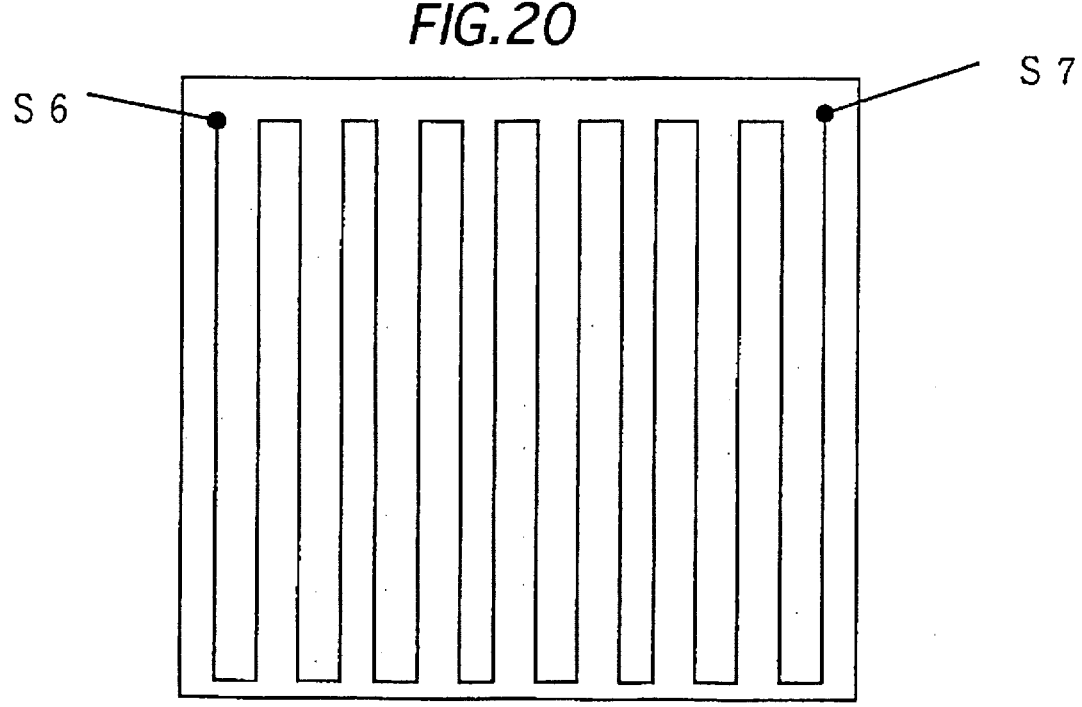
FIG. 20 shows an example of a running route of a robot in area C.

As shown in FIG. 19, lateral movement w' may be calculated to enable running with minimal lateral movement within a range of movement which does not exceed lateral movement w, so as to create a route wherein all lateral movement is uniform. FIG. 20 shows an example of effective route making from point S6 to point S7 of area C so as to have uniform lateral movement in the same manner as shown in FIG. 19.

As described above, the routes of areas A, B, and C are combined to make a route for the entire work area. The sequence of running through areas A, B, and C are determined beforehand. For example, if the unit is run in the sequence of area, A, area B, area C, the route moving from the end point (point S3) of the route of area A to the starting point (point S4) of area B is added to the route moving from the end point (point S5) of the route of area B to the starting point (point S6) of the route of area C.

Figure 21:
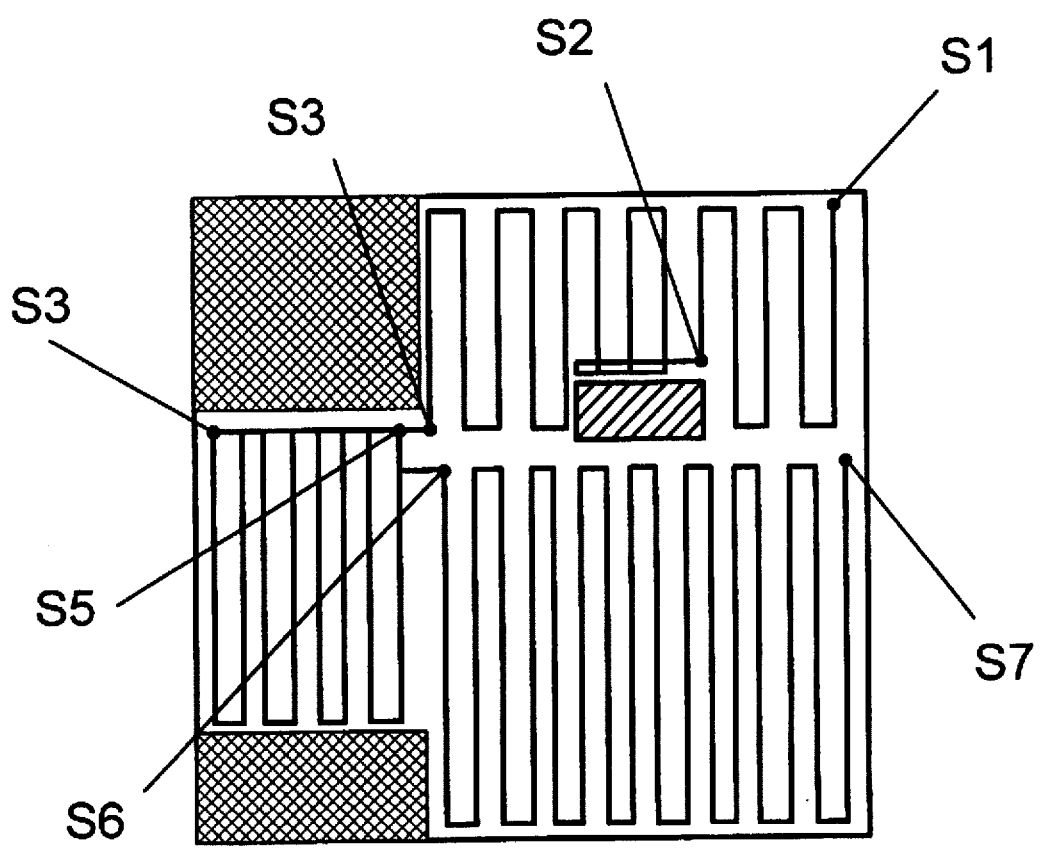
FIG. 21 shows an example of a running route of a robot throughout all areas.
Figure 22:
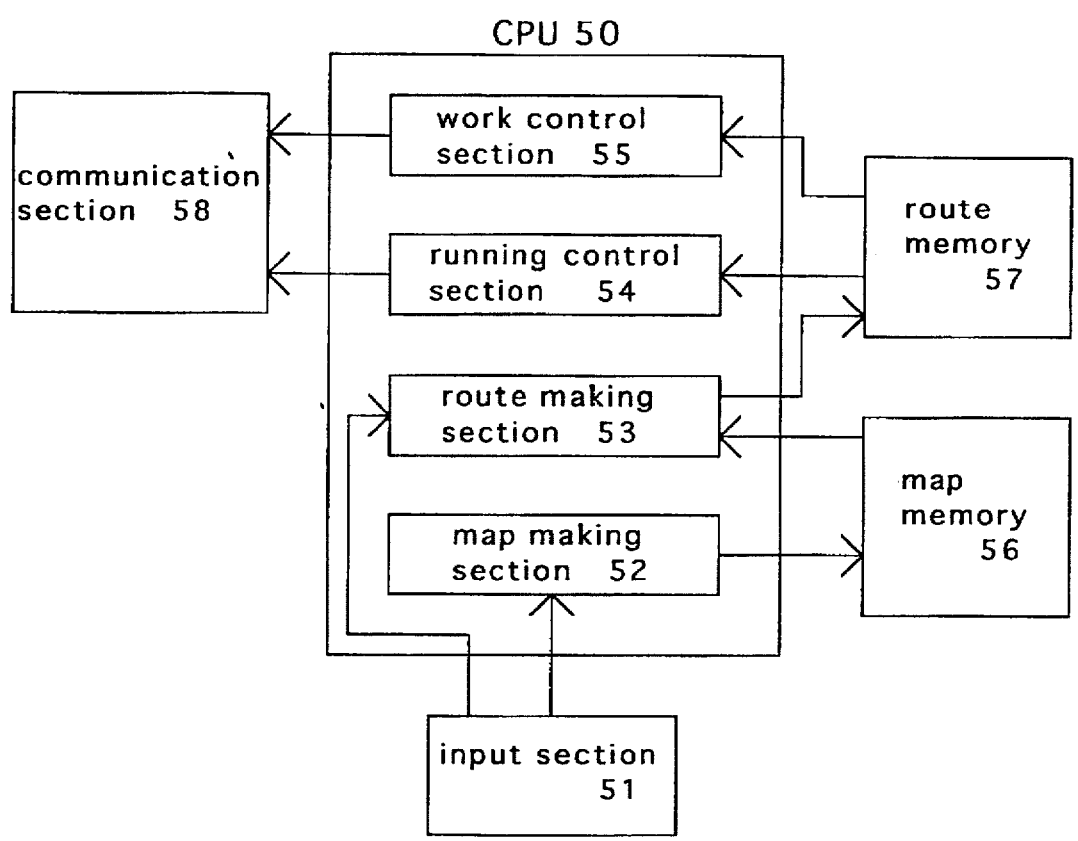
FIG. 22 is a block diagram of the robot control system.

The resulting route for the entire work area created as described above is shown in FIG. 21. If the autonomously running vacuum cleaner moves (works) in accordance with this route, the entire work area can be completely vacuumed.

Furthermore, if the starting point and end point of the various areas are set such that the end point of area A is the starting point of area B, and the end point of area B is the starting point of area C, the movement between areas can be omitted.

Figure 14:
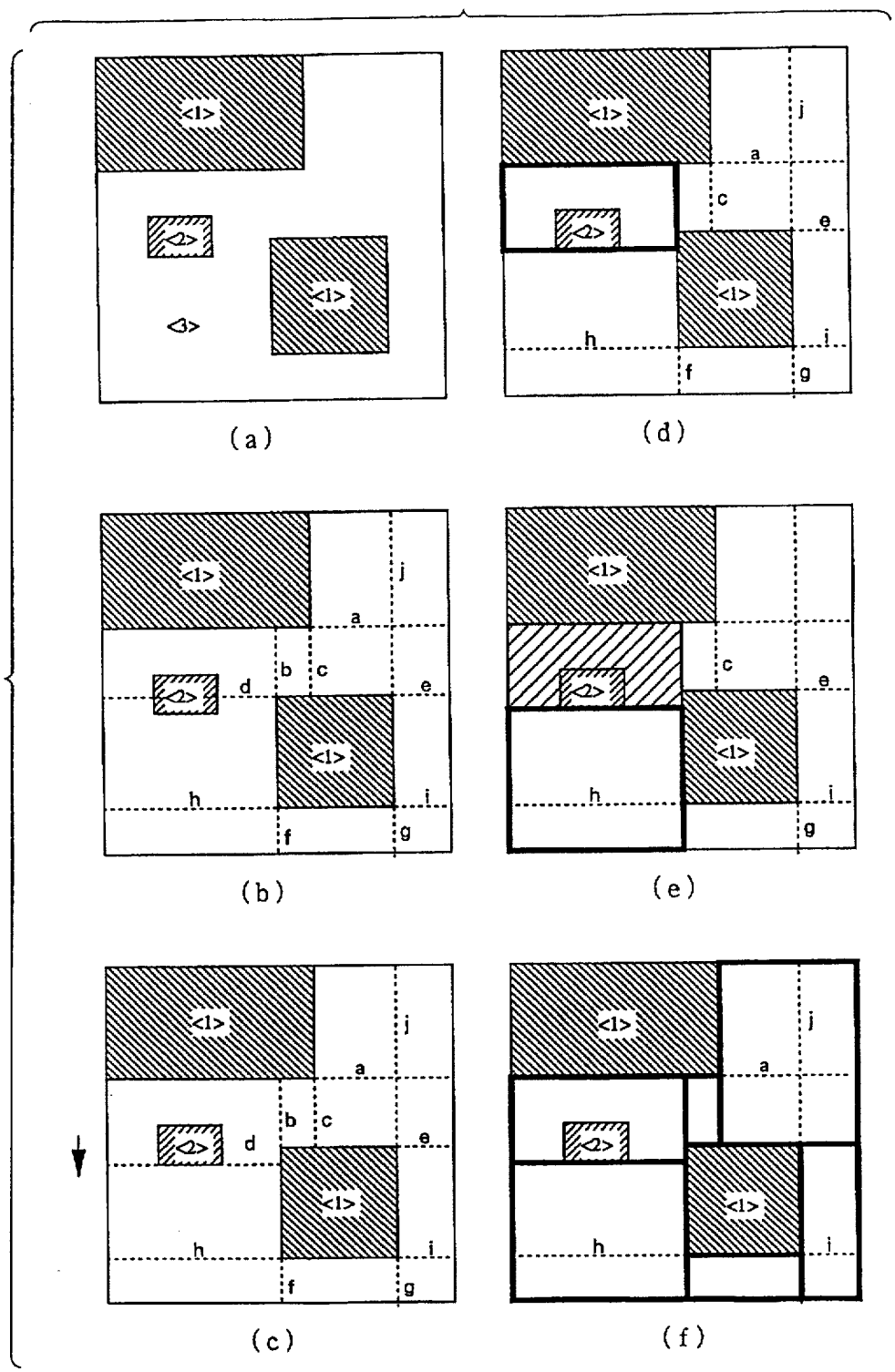
FIG. 14 is an illustration showing examples of area divisions.
Figure 15:
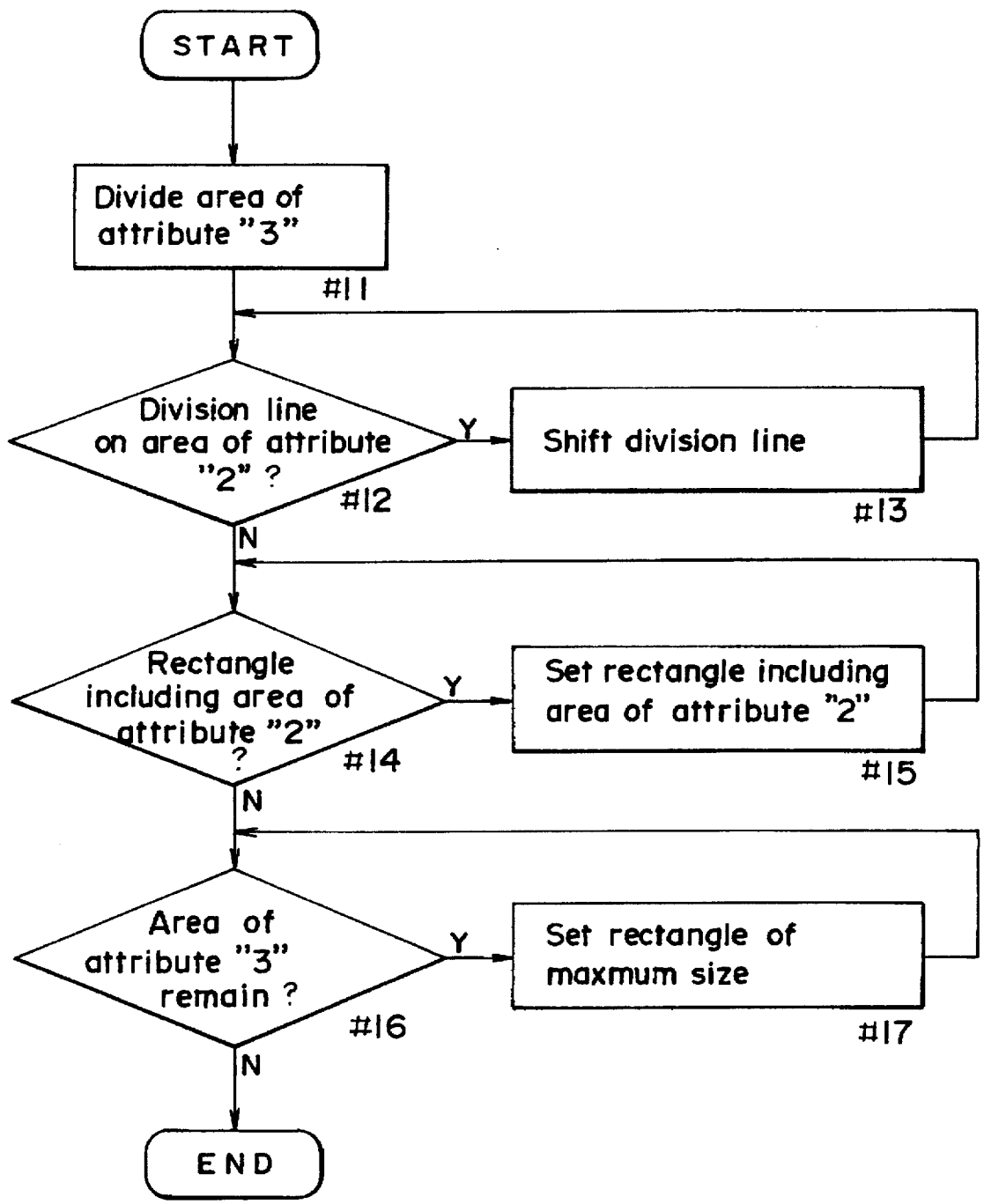
FIG. 15 is a flow chart representing examples of area divisions.

Although the description above has been presented in relation to the areas of FIG. 12, it is to be understood that routes may be similarly made relative to the areas of FIG. 14.

Area division and route making may be accomplished automatically by computer, or input manually by an operator using a pointing device such as a mouse or the like. Portions which can be automatically realized by computer (areas without obstruction) may be done by computer, and portions which cannot be automatically generated (areas with obstructions) may be input manually by an operator.

The robot control functions of the robot control system are described below. In running control section 54, controls are executed to run the mobile robot of the previous example in accordance with a route stored in route memory 57. At the same time, in work control section 55, controls are executed for the working section of the mobile robot in accordance with the route stored in route memory 57 and the area attributes stored in map memory 56 (e.g., in the aforesaid example, controlling the operation of the vacuum nozzle 37 of the autonomously running vacuum cleaner). Control signals from running control section 54 and work control section 55 are transmitted to a receiver section (not illustrated) of the robot.

Although the mobile robot has been described in terms of an autonomously running vacuum cleaner in the present embodiment, it is to be understood that the present invention is not limited to an autonomously running vacuum cleaner, and may be adapted to mobile robots doing other types of work.

Although the robot control system is separate from the mobile robot, said system may be incorporated in a mobile robot. In such cases, the transmitting unit 58 of the robot control system and the receiving unit of the mobile robot are unnecessary.

As previously described, the present invention stores areas with attributes corresponding to the condition of the area including areas accessible to the body member and areas accessible to the working member and the like, and creates a route based on said attributes, thereby allowing work to be accomplished in areas impossible by conventional means.

Even when attributes of areas are set in detail, the routes for areas having various attributes can be designed separately, such that route design for the mobile robot does not become complicated, and it is possible to accomplish finely detailed work relative to each area. It is also possible to design optimally efficient routes for each area because said individual routes are set by the most suitable method.

Control of the mobile robot is simplified because the mobile robot is automatically controlled based on the created routes and area attributes.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A route making system for a mobile robot having a body member and a working member, and the mobile robot travels along a route on a floor and carries out work proper for an attribute of each area on the floor while traveling, wherein the attribute indicates the areas which can be accessed by both the working member and the body member, by only the working member, and by neither the working member nor the body member, comprising:

an input device which inputs area information including the attribute of each area;

a calculator which calculates a route for the mobile robot based on the input area information;

and wherein the mobile robot travels along the route and carries out work proper for the attribute of each area while traveling.

2. A route making system as claimed in claim 1, further comprising:

a controller which controls traveling and work of the mobile robot based on the route and the area information, so that the mobile robot carries out work proper for the attribute of each area while traveling.

3. A route making system as claimed in claim 1, further comprising:

an area information memory which stores the input area information.

4. A route making system as claimed in claim 1, further comprising:

a route memory which stores the route.

5. A route making system as claimed in claim 1, wherein the route making system is built in the mobile robot.

6. A route making system as claimed in claim 1, wherein the working member is projected from the body member.

7. A route making system as claimed in claim 6, wherein the working member moves with respect to the body member, and the calculator further calculates a movement pattern of the working member based on the input area information.

8. A route making system as claimed in claim 1, wherein the route making system comprises the mobile robot and a control terminal, the control terminal is separate from the mobile robot, the control terminal includes the input device and the calculator, said control terminal having a transmitter which transmits the route to the mobile robot.

9. A route making system as claimed in claim 1, wherein the calculator divides the area into plural blocks based on the attribute and calculates a route for each block.

10. A route making system as claimed in claim 1, further comprising a manual input device which inputs to the calculator a route manually by an operator, wherein the mobile robot travels along the manually input route.

11. A route making system for a mobile robot having a body member and a working member, and the mobile robot travels along a route on a floor and carries out work proper for an attribute of each area on the floor while traveling, wherein the attribute indicates the areas which can be accessed by both the working member and the body member, by only the working member, and by neither the working member nor the body member, comprising:

- a calculator which calculates a route for the mobile robot based on a predetermined area information including the attribute of each area;
- and wherein the mobile robot travels along the route and carries out work proper for the attribute of each area while traveling.

12. A route making system as claimed in claim 11, further comprising:

- a controller which controls traveling and work of the mobile robot based on the route and the area information, so that the mobile robot carries out work proper for the attribute of each area while traveling.

13. A route making system as claimed in claim 11, further comprising:

- a route memory which stores the route.

14. A route making system as claimed in claim 11, wherein the route making system is built in the mobile robot.

15. A route making system as claimed in claim 11, wherein the working member is projected from the body member.

16. A route making system as claimed in claim 15, wherein the working member moves with respect to the body member, and the calculator further calculates a movement pattern of the working member based on the input area information.

17. A route making system as claimed in claim 11, wherein the route making system comprises the mobile robot and a control terminal, the control terminal is separate from the mobile robot, the control terminal includes the calculator, said control terminal having a transmitter which transmits the route to the mobile robot.

18. A route making system as claimed in claim 11, wherein the calculator divides the area into plural blocks based on the attribute and calculates a route for each block.

19. A route making system as claimed in claim 11, further comprising

- a manual input device which inputs to the calculator a route manually by an operator, wherein the mobile robot travels along the manually input route.

20. A mobile robot control system which controls a mobile robot having a body member and a working member, and the mobile robot carries out work proper for an attribute of each area on the floor, wherein the attribute indicates the areas which can be accessed by both the working member and the body member, by only the working member, and by neither the working member nor the body member, comprising:

- an input device which inputs area information including the attribute of each area;
- a controller which controls traveling and work of the mobile robot based on the input area information, so that the mobile robot carries out work proper for the attribute of each area.

21. A mobile robot control system as claimed in claim 20, further comprising,

- an area information memory which stores the input area information.

22. A mobile robot control system as claimed in claim 20, wherein the mobile robot control system is built in the mobile robot.

23. A mobile robot control system as claimed in claim 20, wherein the working member is projected from the body member.

24. A mobile robot control system as claimed in claim 20, wherein the mobile robot control system comprises the mobile robot and a control terminal, the control terminal is separate from the mobile robot, the control terminal includes the input device and the controller.

* * * * *